United States Patent [19]

Byrd, III

[11] 3,845,961

[45] Nov. 5, 1974

[54] SELF-LOCKING SEAL FOR GENERATOR LEADS

[75] Inventor: Walter C. Byrd, III, Kettering, Ohio

[73] Assignee: General Motors Corp., Detroit, Mich.

[22] Filed: Sept. 17, 1973

[21] Appl. No.: 398,002

[52] U.S. Cl............ 277/212 F, 174/153 G, 248/56
[51] Int. Cl....... F16j 15/10, F16l 5/02, H01b 17/30
[58] Field of Search.......... 174/65 G, 152 G, 153 R, 174/153 G; 16/2; 248/56; 285/158, 159, 162, 196; 339/94 A, 103 B, 126 RS; 403/197, 225, 243, 247; 277/12, 166, 178; 24/73 HS; 277/212 R, 212 C, 212 F

[56] References Cited
UNITED STATES PATENTS

| 2,219,940 | 10/1940 | Ritz-Woller | 174/152 G X |
| 2,876,485 | 3/1959 | Cowles | 16/2 X |
| 2,926,210 | 2/1960 | Sturges | 174/153 R UX |
| 3,788,655 | 1/1974 | Hathaway | 277/212 F |

FOREIGN PATENTS OR APPLICATIONS

| 212,332 | 1/1958 | Australia | 174/153 G |
| 1,222,697 | 1/1960 | France | 24/73 HS |

Primary Examiner—Laramie E. Askin
Attorney, Agent, or Firm—Howard N. Conkey

[57] ABSTRACT

A self-locking seal for a generator lead passing through an aperture in the generator casing includes a generally flat base member having an integral circular flange extending therefrom. The base member and the flange have an aperture extending therethrough concentric with the flange. The outer radius of the flange is less than the radius of the aperture in the generator casing by an amount generally equal to the thickness of the generator casing and the diameter of the aperture in the flange and base member is less than the diameter of the generator lead. Further, the radius of the generator lead plus the thickness of the base member is greater than the radius of the aperture in the generator casing. When the flange is positioned through the aperture in the generator casing from within the casing and the lead is inserted through the aperture in the base member and the flange from within the casing, the outer surface of the flange sealingly engages the outer surface of the casing around the aperture therein and the base member sealingly engages the inner surface of the casing, the wall of the aperture therein and the lead.

1 Claim, 4 Drawing Figures

PATENTED NOV 5 1974　　　　　　　　　3,845,961

SELF-LOCKING SEAL FOR GENERATOR LEADS

This invention relates to a sealing member for providing a seal between an electrical lead and an aperture in a wall or casing through which said lead passes, and more specifically, to such a sealing member which is self-locking.

Previous devices for providing a seal between apertures in dynamoelectric machine walls or casings and electrical leads passing therethrough are configured so as to make them substantially difficult to mold and to install. In addition, some of the known seals require the use of clamps and are also relatively difficult to install.

It is the general object of this invention to provide a self-locking seal for sealing between an aperture in a wall and a cylindrical member passing therethrough having improved sealing and self-locking features.

It is another object of this invention to provide a self-locking seal for sealing between a wall of a dynamoelectric machine and an electrical lead passing therethrough characterized by its ease of molding and ease of installation.

The self-locking seal according to the preferred embodiment of the invention takes the form of a generally flat base member having an integral circular flange extending therefrom. The base member and flange have an aperture extending therethrough concentric with the flange. The outer radius of the flange is less than the radius of an aperture in a generator wall through which an electrical lead is to pass by an amount generally equal to the thickness of the generator wall and the aperture in the flange and base member has a diameter less than the diameter of the generator lead. Further, the sum of the radius of the electrical lead and the thickness of the base member is greater than the radius of the aperture in the generator wall. The base member of the seal is positioned to abut one surface of the generator wall with the flange thereon extending through the aperture in the generator wall. The lead is inserted through the aperture in the seal and through the aperture in the generator wall. Upon insertion of the lead, the outer surface of the flange engages the opposite surface of the generator wall around the aperture therein. Upon insertion, the generator lead and seal become self locking with the base member and flange sealingly engaging opposite surfaces of the generator wall, the wall of the aperture therein, and the lead.

The invention may be best understood by reference to the following description of the preferred embodiment and the figures in which.

Figure 1:
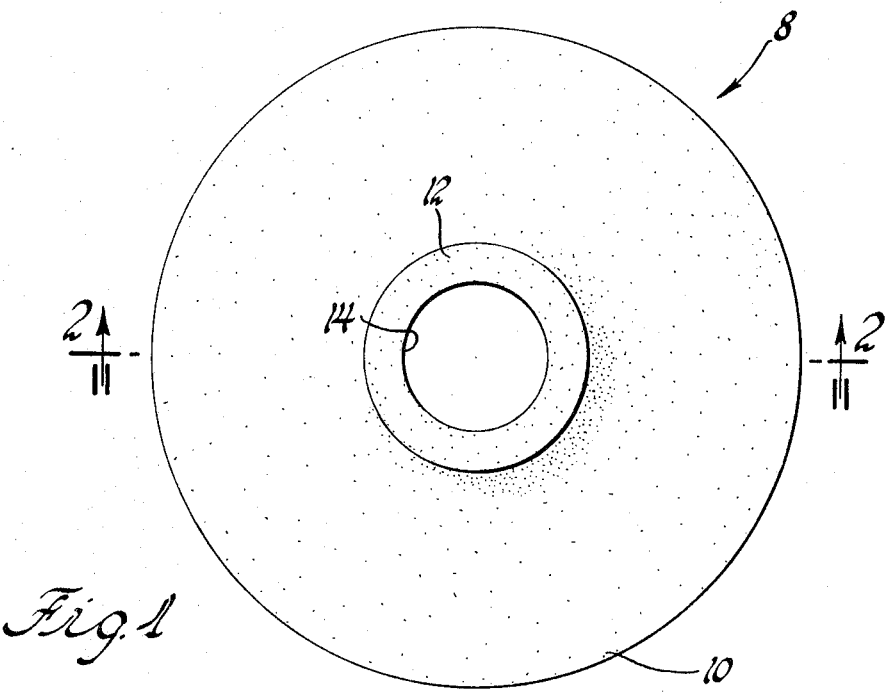
FIG. 1 is a top view of the self-locking seal of the subject invention.
Figure 2:
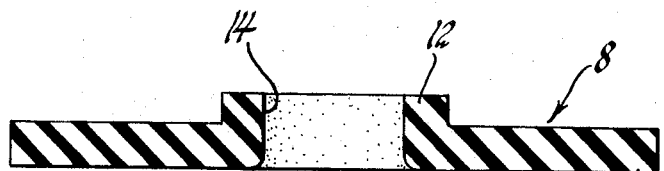
FIG. 2 is a sectional view of the self-locking seal as viewed along lines 2—2 of FIG. 1.

Referring to FIGS. 1 and 2, the self-locking seal 8 of this invention is comprised of a molded resilient material, such as rubber, and includes a generally flat base member 10 having an integral circular flange 12 extending therefrom. The base portion 10 and the flange 12 have an aperture 14 extending therethrough concentric with the flange 12. The simplicity of the design of self-locking seal 8, as viewed in FIGS. 1 and 2, makes it substantially easy to mold.

Figure 3:
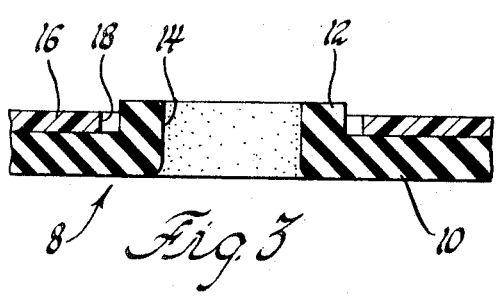
FIG. 3 illustrates the position of the self-locking seal prior to insertion of the electrical lead therethrough.
Figure 4:
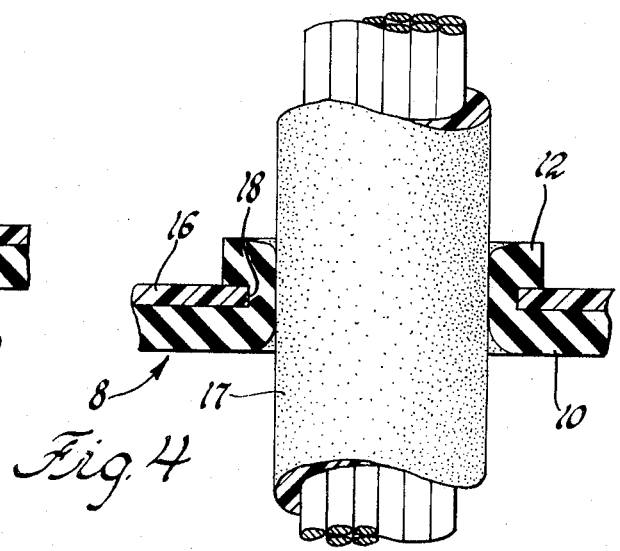
FIG. 4 is a view illustrating the self-locking seal following insertion of the electrical lead.

Referring to FIGS. 3 and 4, the self-locking seal of this invention is illustrated in conjunction with a wall 16 in an oil cooled dynamoelectric machine such as a generator in which it is necessary to provide sealing between the wall 16 and an electrical lead 17 passing therethrough. The wall 16 may take the form of an insulator in the generator, the generator casing of any other surface through which the lead 17 must pass. The wall 16 includes an aperture 18 through which the electrical lead 17 passes. The outer radius of the flange 12 is made less than the radius of the aperture 18 by an amount generally equal to the thickness of the wall 16 and the diameter of the aperture 14 in the base member 10 and the flange 12 is made less than the diameter of the lead 17. In addition, the sum of the radius of the lead 17 and the thickness of the base member 10 is made greater than the radius of the aperture 18.

To provide for a self-locking seal between the wall 16 of the dynamoelectric machine and the lead 17, the flange 12 is inserted through the aperture 18 in the wall 16 so that the base member 12 abuts the inner surface thereof. The lead 17 is then inserted through the aperture 14 and the aperture 18 in the direction shown in FIG. 4. The lead 17 insertion deforms the self-locking seal 8 as shown in FIG. 4 so as to force the flange 12 and the base member 10 to wrap around the aperture 18 such that the outer surface of the flange 12 sealingly engages the outer surface of the wall 16 and the base member 10 sealingly engages the inner surface of the wall 16, the wall of the aperture 18 and the lead 17. In addition, when the lead 17 is inserted as illustrated in FIG. 4, the seal 8 and lead 17 are self locked into the sealing position until the lead 17 is forcefully extracted.

As can be seen from the foregoing, what has been described is a self-locking seal having improved sealing features, ease of installation, and simplicity of design to allow ease of molding.

Although the subject self-locking seal has been illustrated with reference to sealing between the wall of a dynamoelectric machine and a lead passing therethrough, it can be seen that the subject seal can be used wherever it is desired to provide a seal between a wall or plate and any cylindrical object passing through an aperture therein. Also, a plurality of flanges, such as the flange 12, may be formed with the base member 10, each being associated with a respective one of a plurality of electrical leads which are to pass through the wall 16.

I claim:

1. A self-locking sealing arrangement comprising:
   a wall having first and second opposed surfaces and an aperture having an edge;
   a seal member having a normal state and an assembled deformed state, said seal member in its normal state including a generally flat resilient base member having first and second opposed surfaces, and a resilient circular flange integrally connected to and extending from the first surface of the base member for insertion through the aperture in wall, the flange having an outer surface with a radius equal to the radius of the aperture in the wall minus the thickness of the wall, the base member and the flange having an aperture therethrough concentric with the flange; and a cylindrical member having a radius less than the radius of the aperture in the wall and greater than the radius of the aperture in the wall minus the thickness of the base member, said cylindrical member being positioned through the seal member and the aperture in the wall to place the seal member in its assembled deformed state with the outer surface of the flange sealingly engaging the first surface of the wall, the first surface of the base member sealingly engaging the second surface of the wall and the edge of the aperture in the wall, and the second surface of the base member sealingly engaging the cylindrical member, a portion of the base member being compressed between the cylindrical member and the edge of the aperture in the wall, whereby the wall, seal member and cylindrical member form a self-locking sealing arrangement.

* * * * *